United States Patent Office 3,080,384
Patented Mar. 5, 1963

3,080,384
SUBSTITUTED BENZOQUINONES AND
PREPARATION THEREOF
Max Kofler, Riehen, Albert Langemann, Basel, and Rudolf Ruegg, Bottmingen, Switzerland, assignors to Hoffmann-La Roche Inc., Nutley, N.J., a corporation of New Jersey
No Drawing. Filed Dec. 23, 1959, Ser. No. 861,429
Claims priority, application Switzerland Dec. 31, 1958
2 Claims. (Cl. 260—396)

This invention relates to novel chemical processes, and also includes novel chemical compounds obtainable by said processes. More particularly, the invention provides a novel method for synthesizing certain substituted-dimethyl-1,4-benzoquinones, corresponding 1,4-benzohydroquinones and 1-monoesters of the latter. The invention further provides certain novel substituted-dimethyl-1,4-benzoquinones, corresponding 1,4-benzohydroquinones, and 1-monoesters of the latter.

A description of the novel processes of the invention will be facilitated by reference to the following flowsheet.

alkanoyloxy (e.g. acetoxy, isobutyroxy), cycloalkanecarbonyloxy (e.g. cyclohexanecarboxy) and monocyclic aroyloxy (e.g. benzoyloxy, toluoyloxy).

The symbol $m$ represents a natural number from 1 to 2, inclusive.

The symbol $n$ represents a natural number from 0 to 9, inclusive.

The symbol Z represents hydrogen, methyl or the radical.

$$(VI) \quad -CH_2-CH=C-\left[-CH_2-CH_2-CH\cdots C-\right]-CH_3$$
$$\quad\quad\quad\quad\quad\; |\quad\quad\quad\quad\quad\quad\quad\quad\quad\;\; |$$
$$\quad\quad\quad\quad\quad CH_3 \quad\quad\quad\quad\quad\quad\quad\;\; CH_3\; ]_n$$

The double bond shown by dotted lines in Formulas II to VI, inclusive, may optionally be saturated.

Also, all cyclic compounds shown in the flowsheet carry two nuclear methyl substituents. It will therefore be understood that when Z represents methyl, $m=1$; whereas when Z represents hydrogen or radical VI, $m=2$.

A first stage in the comprehensive process embodiment referred to above comprises condensing, in the presence of an acidic condensing agent, (a) a member selected from the group consisting of 2,3-dimethyl-1,4-benzohydroquinone, 2,5-dimethyl-1,4,-benzohydroquinone, 2,6-dimethyl-1,4-benzohydroquinone, and 1-monoesters of each of the foregoing with monocarboxylic acids which, exclusive of oxygen in the carboxyl group, are comprised entirely of carbon and hydrogen atoms (all of the foregoing being represented by the general Formula I) and (b) a tertiary α,β-unsaturated compound represented by the general Formula II or a primary α,β-unsaturated allyl-rearrangement product thereof represented by general Formula III.

The reactants II or III may be considered as being derived in a structural sense from isoprene. The reactive

FLOW SHEET (I) 2,6-dimethyl-4-OR-phenol with OH at position 1

(II) $CH_2=CH-\underset{CH_3}{\underset{|}{C}}-X-\left[-CH_2-CH_2-CH\cdots \underset{CH_3}{\underset{|}{C}}-\right]_n-CH_3$ or (III) $X-CH_2-CH=\underset{CH_3}{\underset{|}{C}}-\left[-CH_2-CH_2-CH\cdots \underset{CH_3}{\underset{|}{C}}-\right]_n-CH_3$ (IV) $(CH_3)_m$-substituted OR, Z, OH benzene with side chain $-CH_2-CH=\underset{CH_3}{\underset{|}{C}}-\left[-CH_2-CH_2-CH\cdots \underset{CH_3}{\underset{|}{C}}-\right]_n-CH_3$ 1. Saponify (if R=acyl)
2. Oxidize (V) $(CH_3)_m$-substituted benzoquinone with Z and side chain $-CH_2-CH=\underset{CH_3}{\underset{|}{C}}-\left[-CH_2-CH_2-CH\cdots \underset{CH_3}{\underset{|}{C}}-\right]_n-CH_3$ In the flowsheet above:

The symbol R represents hydrogen or an acyl radical which contains not more than 8 carbon atoms and which, exclusive of oxygen in the carbonyl function, is comprised entirely of carbon and hydrogen. Illustrative of such radicals are lower alkanoyl, e.g. formyl, acetyl, isobutyryl, caprylyl, etc.; cycloalkanecarbonyl, e.g. cyclopentylcarbonyl, cyclohexylcarbonyl, etc.; and monocyclic aroyl, e.g. benzoyl, toluoyl.

The symbol X represents halogen or hydroxy or an acyloxy or alkoxy radical which contain not more than 8 carbon atoms. The acyloxy radical, exclusive of oxygen in the carboxy function, is comprised entirely of carbon and hydrogen atoms. Illustrative meanings of X include chlorine, bromine, hydroxy, methoxy, isopropyloxy, lower group X is either on the number 3 carbon atom in the chain, in which case there is a double bond between the 1- and 2-carbon atoms, in α,β-position to X; or the reactive group is at the end of the chain, on the number 1 carbon atom, in which case there is also a double bond in α,β-position to X. The reactants II and III can contain carbon atoms in an amount up to 50 carbon atoms, but only in multiples of five. It will be appreciated that the reactants II and III, therefore, include the alcohols phytol and isophytol and higher and lower isoprenologs thereof, as well as hydrogenated derivatives thereof wherein one or more double bonds, exclusive of the terminal α,β-double bond, has ben reduced; and also halides and other esters, as defined above, derivable from the alcohols. Alcohols which are particularly useful in the processes of the invention include phytol, isophytol, linalool, geranyllinalool, farnesylnerolidol and 3,7,11,15,19,23,27,31,35-nonamethyl - 2,6,10,14,18,22,26,30,34 - hexatriacontanonaen-1-ol. Suitable oxygen-containing esters of the alcohols include, for instance, the acetate and the benzoate of the various alcohols. Suitable halogen-containing esters include the chloride and the bromide of the various alcohols. When employing a halide, it is ordinarily preferable to employ a primary halide (the allyl-rearrangement product III) rather than tertiary halide II, since the later are rather unstable. Suitable halides for use in the processes of the invention include, for instance, geranyl chloride and bromide and phytyl chloride and bromide.

The reaction of the dimethyl-1,4-benzohydroquinone (or ester thereof) reactant I with the reactant which introduces the side chain, i.e. reactant II or III, is effected in the presence of an acidic condensing agent. There are thus obtained condensation products in which one or two side chains of Formula VI above have been introduced in α,β-position of the benzohydroquinone nucleus. Suitable acidic condensing agents include zinc chloride, boron trifluoride, aluminum chloride, and other "Lewis acids" or ansolvo acids. A preferred condensing agent is zinc chloride with or without addition of glacial acetic acid. The condensation reaction is preferably effected under mild conditions; thus, preferably in the presence of a solvent, e.g. diethyl ether, diisopropyl ether or dioxan, at room temperature or up to the reflux temperature of the solvent. In order to avoid side reactions, temperatures above about 40° C. are ordinarily avoided. A preferred mode of execution of the condensation step comprises reacting a tertiary alcohol of Formula I with a dimethyl-1,4-benzohydroquinone reactant in absolute ether, using zinc chloride with addition of a little glacial acetic acid as condensing agent, at temperatures below 40° C.

In the event an acyl derivative is used as reactant I, the hydroxyl group in 1-position of the condensation product is liberated by saponification before further processing. Advantageously, the saponification is effected in the presence of an inert atmosphere, e.g. under nitrogen. The products thus obtained are pale yellow monosubstituted-dimethyl-1,4-benzohydroquinones, or mixtures of mono- and disubstituted-dimethyl-1,4-benzohydroquinones, which can be separated and purified by chromatography.

A subsequent stage in the comprehensive process embodiment referred to above comprises oxidizing the substituted-dimethyl-1,4-benzohydroquinones obtained in the manner described above. The oxidation can be effected by methods known per se for the oxidation of hydroquinones. An appropriate method comprises shaking the substituted-dimethyl-1,4-benzohydroquinone in ethereal solution with silver oxide at room temperatures. The crude product can be purified by methods known per se, for example by chromatography. The substituted-dimethyl-1,4-benzoquinones obtained are yellow compounds which exhibit typical maxima in the ultarviolet absorption spectrum.

The end products obtainable by the processes of the invention said products being represented collectively by Formula V above, are useful as substitutes for the corresponding 2,3-dimethoxy-5-methyl-1,4-benzoquinone compounds, which in turn are fundamental components for the biological oxidation systems. Since they cannot be synthesized in the body, they must be supplied from outside as vitamins. A deficiency caused by insufficient supply of the organism with such compounds may be compensated in that the compounds are added to foods and feedstuffs. There is an especially high need of said compounds under stress conditions, e.g. in case of treatments with antibacterial or antiparasitic preparations. Moreover the homologs show fungistatic efficiency against Trichophyton mentagrophytes. The substituted-dimethyl-1,4-benzohydroquinones obtainable by the processes of the invention, included collectively under Formula IV above, are useful as antioxidants for foodstuffs, feedstuffs, vitamin preparations and the like.

The invention is further disclosed in the following examples, which are illustrative but not limitative thereof. All temperatures are stated in degrees centigrade.

*Example 1*

Five g. of 2,6-dimethyl-1,4-benzohydroquinone, 2.7 g. of anhydrous zinc chloride, 10.7 g. of isophytol, 300 ml. of absolute ether and 0.3 ml. of glacial acetic acid are shaken overnight and then refluxed for 1½ hours. The solvent is evaporated at room temperature under water pump vacuum, the residue is dissolved in 400 ml. of petroleum ether (boiling range 40–45°) and 150 ml. of 75% methanol. The petroleum ether solution is washed twice with 150 ml. of 75% methanol, dried with sodium sulfate and the solvent is evaporated. The residue is dissolved in 200 ml. of ether, shaken with 20 g. of silver oxide for two hours at room temperature, the solution is filtered and the solvent evaporated from the filtrate. The residue is dissolved in petroleum ether and chromatographed on a column of 500 g. of silica gel. Twelve liters of petroleum ether are used to elute a light yellow oil which is not investigated further. Further elution with 15 liters of petroleum ether (containing 1% of benzene) eluted 4 g. of a yellow oil exhibiting a negative Craven test (cf. J. Chem. Soc. 1931, 1605). This product comprises 2,6-dimethyl-3,5-diphytyl-1,4- benzoquinone; U.V. maxima at 260 mμ and 267 mμ;

$E_{1cm}^{1\%} = $ ca. 245 (in petroleum ether)

Further elution with 4 liters of petroleum ether (containing 50% benzene) yields 5 g. of a dark yellow oil which exhibits a positive Craven test. This is chromatographed on a column of 50 g. of polyethylene powder ("Hostalen-W"). Elution with 1.3 liters of 85% acetone yields 4.5 g. of 2,6-dimethyl-3-phytyl-1,4-benzoquinone; U.V. maxima at 255 mμ and 262 mμ;

$E_{1cm}^{1\%} = $ ca. 430 (in petroleum ether)

*Example 2*

Five g. of 2,5-dimethyl-1-4-benzoquinone in 150 ml. of ether are shaken with 0.6 g. of palladium-lead-calcium carbonate catalyst [Lindlar, Helvetica Chimica Acta 35, 336 (1959)], at room temperature in a hydrogen atmosphere, until the hydrogen uptake is ended (requires about 30 minutes). Then the catalyst is filtered off, the solvent is evaporated in a water pump vacuum and the crystalline product is dried in vacuo. To effect the condensation the hydroquinone obtained by the preceding hydrogenation is dissolved in 300 ml. of absolute ether and shaken overnight in a nitrogen atmosphere at room temperature with 0.3 ml. of glacial acetic acid, 2.7 g. of anhydrous zinc chloride and 10.7 g. of isophytol, then the reaction mixture is refluxed for 1½ hours. Upon oxidation and working up according to the indications in Example 1, there is obtained 2,5-dimethyl-3,6-diphytyl-1,4-benzoquinone as a yellow viscous oil; and 2,5-dimethyl-3-phytyl-1,4-benzoquinone as a dark yellow oil, U.V. maxima at 254 mμ and 261 mμ (in petroleum ether).

Example 3

Six g. of 2,3-dimethyl-1,4-benzoquinone are reduced to the corresponding hydroquinone in the manner indicated in Example 2 and condensed with 11 g. of isophytol as indicated in Example 2. After oxidation and working up according to the indications in Example 1, there is obtained 2,3-dimethyl-5,6-diphytyl-1,4-benzoquinone as a yellow viscous oil; U.V. maxima at 259 m$\mu$ and 268 m$\mu$ (in petroleum ether). In addition there is obtained 2,3-dimethyl-5-phytyl-1,4-benzoquinone as a dark yellow oil; U.V. maxima at 253 m$\mu$ and 261 m$\mu$ (in petroleum ether).

Example 4

3.5 g. of 2,3-dimethyl-1,4-benzoquinone, 1.7 g. of anhydrous zinc chloride and 1.7 g. of isophytol are dissolved in 40 ml. of dry dioxan and refluxed for 30 minutes. The light yellow mixture is dissolved in 100 ml. of 70% methanol and extracted three times with 100 ml. of petroleum ether (boiling range 40–45°). Each extract of petroleum ether is extracted in turn with 20 ml. of 70% methanol. The methanol extracts are combined, evaporated, extracted with ether, and washed with water. Upon evaporation of the ether extracts, there are obtained 3.0 g. of 2,3-dimethyl-1,4-benzoquinone, M.P. 201–204°. The petroleum ether extracts are combined and the solvent is evaporated. The residue is dissolved in 100 ml. of ether and shaken with 1.5 g. of silver oxide for 30 minutes at room temperature. Then the reaction mixture is filtered and the solvent evaporated from the filtrate yielding 2.0 g. of a dark yellow oil which exhibits a positive Craven test and contains 2,3-dimethyl-5-phytyl-1,4-benzoquinone; U.V. maxima in petroleum ether at 253 m$\mu$ ($E_{1\ cm.}^{1\%}=175$) and 260 m$\mu$ ($E_{1\ cm.}^{1\%}=17$

Example 5

25 kg. of tobacco dust are stirred for 2 hours with 125 liters of petroleum ether (boiling range 30–45°). The mixture is then filtered and the filtrate freed of the solvent. The residue, about 1000 g., is dissolved in twice its amount of 30% methanolic potassium hydroxide, added with 1 g. of pyrogallol and saponified under nitrogen at reflux temperature. The solution is coiled down, diluted with 10 liters of methanol-water (90:10) and extracted twice with 10 liters of petroleum ether (boiling range 30–45°). The combined petroleum ether extracts are washer three times with 10 liters of methanol-water (90–10), dried over calcium chloride and concentrated to about 2 liters. The remaining petroleum ether solution is chromatographed on a column of 5 kg. aluminum oxide (Brockmann, activity grade I, 7% water). 15 liters of pure petroleum ether are used to elute about 200 g. of a mixture consisting of hydrocarbons and other accompanying substances. Then, 15 liters of a mixture of ether-petroleum ether (10:90) are used to elute about 150 g. of a waxy yellow-orange mass which according to the I.R. spectrum consists mainly of 3,7,11,15,19,23,27,31,35-nonamethyl - 2,6,10,14,18,22,26,30,34 - hexatriacontonaen-1-ol. This product, which may be used direct without further purification, may be purified by chromatography on a large amount of aluminum oxide or by recrystallization from methanol; M.P. 36–38°.

1.5 g. of the alcohol thus obtained, 1.5 g. of 2,3-dimethoxy-1,4-benzohydroquinone, 1.0 g. of zinc chloride and 0.1 ml. of glacial acetic acid are refluxed for 6 hours in 100 ml. of absolute ether. Then, the ether is evaporated at 40–50°, the residue is distributed between petroleum ether (boiling range 40–50°) and 75% methanol-water, and the petroleum ether extract is concentrated to dryness. The substance when purified forms colorless crystals melting at 59–61°; U.V. maximum in petroleum ether at 290 m$\mu$ ($E_{1\ cm.}^{1\%}=51$)

The brown, oily residue is dissolved in 50 ml. of ether and shaken with 2 g. of silver oxide for one hour at room temperature. The solution is then filtered and the solvent evaporated off. The dark yellow crude product is chromatographed on a column of 50 g. of silica gel. 1.5 liters of petroleum ether are used to elute 204 mg. of a colorless oil, which is discarded. Elution with 2.5 liters of 10% benzene-petroleum ether gives 110 mg. of a dark yellow oil. Further elution with 500 ml. of 10% benzene-petroleum ether gives 301 mg. of a yellow oil having a U.V. maximum at 254 m$\mu$ ($E_{1\ cm.}^{1\%}=180$)

85 mg. of this product are chromatographer on a column of 10 g. of polyethylene powder (Hostalen-W) using 100 ml. of 80% acetone, 100 ml. of 85% acetone and 100 ml. of 90% acetone; fractions of 6 ml. are collected. Fractions 1–32 are discarded; fractions 33–42 yield light yellow leaflets of 2,3-dimethyl-5-(3,7,11,15,19,23,27,31, 35 - nonamethyl - 2,6,10,14,18,22,26,30,34 - hexatriacontanonaen-1-yl)-1,4-benzoquinone; M.P. 45–47°; U.V. maximum at 254 m$\mu$ ($E_{1\ cm.}^{1\%}=245$)

Example 6

A solution of 53 g. of 3,7,11,15,19,23,27,31,35-nonamethyl - 2,6,10,14,18,22,26,30,34-hexatriacontanonaen-1-ol, obtained according to Example 5, 50 ml. of petroleum ether (boiling range 40–45°), 70 ml. of absolute ether and 1.8 ml. of pyridine is added, while stirring at 0–10°, within one hour, to a solution of 3.5 ml. of phosphorus tribromide in 20 ml. of petroleum ether. Stirring is continued for two hours at 0°, the mixture is poured onto ice water, stirred for 10 minutes and extracted wtih ether. The ether solution is washed with water, 5% sodium hydrogen carbonate solution and again with water. After drying over sodium sulfate and evaporating off the solvents, 55 g. of the bromide are obtained as a thick yellowish oil ($n_D^{24}=1.5122$), which solidifies on standing to form a waxy mass. The latter is mixed with 12.6 g. of ethyl acetoacetate and the mixture is added dropwise, within 30 minutes, at about 10°, with a solution of 1.8 g. sodium in 80 ml. of absolute alcohol, while stirring vigorously. Thereupon, stirring is continued for 15 hours at 20°, the solution is heated to 80°, added dropwise within one hour with 120 g. of a 10% aqueous sodium hydroxyde solution and stirred for 4 hours at 80°. After cooling, the reaction mixture is poured onto ice water, extratced with ether and the ether solutions washer with water. After drying over sodium sulfate and evaporating off the solvent, 47 g. of 6,10,14,18,22,26,30,34,38-nonamethyl - 5,9,13,17,21,25,29,38,37-nonatriacontanonaen-2-one are obtained. Crystallization in acetone at 0° gives fine needles.

A solution of 38.5 g. of the ketone thus obtained in 150 ml. of absolute ether is dropped, at the boiling temperature of the ammonia, into a solution of sodium acetylide prepared from 3 g. of sodium and acetylene in 500 ml. of liquid ammonia. Thereupon, the solution is agitated for 15 hours at 20° in an autoclave and the ammonia blown off. The residue is added to 20 g. of ammonium chloride, the mixture poured onto ice water and extracted with ether. The ether solution is washed once with water, dried over sodium sulfate and the solvent evaporated off. 35 g. of 3,7,11,15,19,23,27,31,35,39-decamethyl-6,10, 14,18,22,26,30,34,38-tetracontanonaen-1-yn-3-ol are thus obtained as a colorless oil, which solidifies on standing in the form of a crystalline mass. Active hydrogen: 1.05 in the cold, 1.85 in the warm. Partial hydrogenation is obtained by dissolving this product in 200 ml. of petroleum ether (boiling range 80–105°) and shaking in a hydrogen atmosphere at 20°, in the presence of 2 g. of palladium-lead-calcium carbonate catalyst (loc. cit.) and 0.2 ml. of quinoline, 1100 ml. of hydrogen being taken up. The catalyst is then filtered off and the filtrate is freed of the solvent under water pump vacuum. 35 g. of 3,7,11,15,19, 23,27,31,35,39 - decamethyl - 1,6,10,14,18,22,26,30,34,38-tetracontadecaen-3-ol are thus obtained. The product crystallises on standing.

A solution of 20 g. of the carbinol thus obtained in 150 ml. of absolute ether is added within one hour, at 20°, while stirring, with 50 ml. of phosphorus tribromide in 50 ml. of absolute ether, and the mixture is stirred for 3 hours at 20°. The mixture is then poured onto ice water and extracted with ether, the ether solution is washed with water, 5% sodium hydrogen carbonate solution and again with water, and dried over sodium sulfate. After evaporation of the solvent 23 g. of the bromide are obtained ($n_D^{25}=1.5124$), which is added, without purification, to 100 ml. of absolute acetone and 20 g. of anhydrous potassium acetate, and boiled for 15 hours. Thereupon the reaction mixture is filtered, the filtrate is freed of the solvent under waterpump vacuum and the residue is refluxed for one hour with 5 g. of sodium hydroxide, 5 ml. of water and 100 ml. of alcohol. After cooling, the solution is diluted with water, extracted with ether, the ether solution is washed once with water, dried over sodium sulfate and concentrated to dryness. 20 g. of crude 3,7,11,15,19,23,27,31,35,39 - decamethyl - 2,6,10,14,18,22,26,30,34,38-tetracontadecaen-1-ol are thus obtained. This product may be purified by chromatography on 1 kg. of aluminum oxide (Brockmann, activity grade I, 5% water). Elution with benzene gives 15 g. of pure product as a colorless oil ($n_D^{22}=1.5100$), which crystallises on standing.

The alcohol thus obtained is reacted with 2,3-dimethyl-1,4-benzohydroquinone according to the method described in Example 5 to form 2,3-dimethyl-5-(3,7,11,15,19,23,27,31,35,39 - decamethyl - 2,6,10,14,18,22,26,30,34,38-tetracontadecaen-1-yl)-1,4-benzoquinone.

We claim:
1. A compound represented by the formula

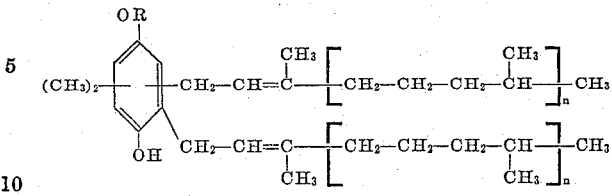

wherein R is selected from the group consisting of hydrogen and acyl radicals which contain not more than 8 carbon atoms and which, exclusive of oxygen in the carbonyl function, are comprised entirely of carbon and hydrogen; and $n$ is a natural number from 0 to 9, inclusive.

2. A compound represented by the formula

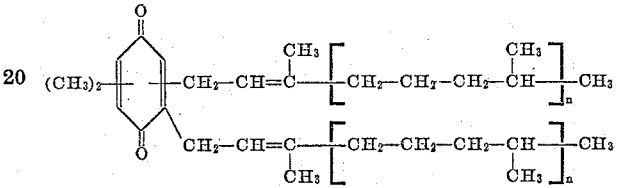

wherein $n$ is a natural number from 0 to 9, inclusive.

References Cited in the file of this patent
UNITED STATES PATENTS

| | | |
|---|---|---|
| 2,208,585 | Karrer | July 23, 1940 |
| 2,376,984 | Tishler | May 29, 1945 |

FOREIGN PATENTS

| | | |
|---|---|---|
| 221,843 | Switzerland | Sept. 1, 1942 |
| 221,844 | Switzerland | Sept. 1, 1942 |